United States Patent
Soffer et al.

[15] 3,697,845
[45] Oct. 10, 1972

[54] CIRCUIT FOR A DIRECT CURRENT ELECTRIC MOTOR WHICH IS CONTROLLED BY THYRISTORS BOTH WHILE RUNNING AND WHILE BEING BRAKED

[72] Inventors: Jacques Soffer, Sceaux; Robert Lhommelet, Bois d'Arcy, both of France

[73] Assignee: Societe Generale de Constructions Electriques et Mecaniques (Alsthom), Paris, France

[22] Filed: Sept. 29, 1970

[21] Appl. No.: 76,563

[52] U.S. Cl................318/341, 318/380, 321/45 C
[51] Int. Cl..............................................H02p 5/16
[58] Field of Search......318/258, 269, 341, 345, 375, 318/379, 380; 321/45 C

[56] References Cited

UNITED STATES PATENTS

| | | | |
|---|---|---|---|
| 3,315,145 | 4/1967 | Menard | 321/45 C |
| 3,344,328 | 9/1967 | Morris | 318/258 |
| 3,428,880 | 2/1969 | Muller | 318/341 |
| 3,492,557 | 1/1970 | Brown | 318/345 |
| 3,504,257 | 3/1970 | Smith | 318/258 |

*Primary Examiner*—Bernard A. Gilheany
*Assistant Examiner*—Thomas Langer
*Attorney*—Arthur O. Klein

[57] ABSTRACT

A circuit for a direct current motor of which the armature is fed, during the driving action of the motor, through the intermediary of a driving thyristor provided with a thyristor extinguishing means, the armature being connected during braking of the motor, through a series connected load resistance and a braking thyristor provided with means for extinguishing the braking thyristor, the extinguishing means comprising a switching inductance and a switching condenser, and a circuit connected in anti-parallel of an extinguishing thyristor and a diode for recharging the switching condenser; the switching condenser has a first terminal connected to a terminal of the motor which is common to the driving thyristor and the braking thyristor, and a second terminal common to the anti-parallel circuit of the means for extinguishing the driving thyristor and to that for extinguishing the braking thyristor, the circuits being so connected that such one switching condenser serves both thyristor extinguishing means.

3 Claims, 3 Drawing Figures

PATENTED OCT 10 1972

3,697,845

INVENTORS:
Jaques SOFFER
Robert LHOMMELET
By: Arthur O. Klein
ATTORNEY 3,697,845

CIRCUIT FOR A DIRECT CURRENT ELECTRIC MOTOR WHICH IS CONTROLLED BY THYRISTORS BOTH WHILE RUNNING AND WHILE BEING BRAKED

The invention relates to the circuit for an electric traction motor which is fed by direct current and the armature of which is fed through the intermediary of a chopper or current interrupter. The armature during braking, functions to generate current which is led to a load, designated a braking load, through the intermediary of a current chopper.

The current choppers comprise a principal thyristor and a circuit for extinguishing the principal thyristor. The extinguishing circuit comprises an extinguishing thyristor, a switching inductance, a switching condenser, and a thyristor for recharging such condenser.

The excitation of the motor may be a separate source of current, or the armature may be connected in series with the field coil, the invention being independent of the mode of excitation of the motor.

The invention is adapted to be applied to rail or street vehicles, in the latter use the motors being driven by rechargeable or consumable batteries, for example.

In circuits for substantially similar purposes heretofore proposed, the choppers for exciting the armature of the motor and for supplying the braking current are independent from each other. In accordance with the present invention, it has been perceived that one can use only a single switching condenser, which is common to the chopper for supplying driving current to the motor and to the chopper for generating braking current. This represents an important economy both in weight and in space requirements because the condensers used (in general) are paper insulated condensers, and are heavy and occupy large spaces.

In accordance with the invention, there is a circuit for supplying a direct current motor in which the armature is fed, during the use of the motor in its driving function, by the intermediary of a driving thyristor supplied with an extinguishing device. There is connected to the driving circuit, during the braking of the motor, a series connected braking load and a braking thyristor provided with means for extinguishing the braking thyristor. The extinguishing circuits include a switching inductance, a switching condenser, and a circuit in anti-parallel of an extinguishing thyristor and a diode for recharging the switching condenser. There is provided only a single switching condenser having one terminal which is connected to a terminal of the motor which is common to the driving thyristor and the braking thyristor, and the second terminal of which is common to said anti-parallel circuit of the extinguishing circuit for the driving thyristor and to the means for extinguishing the braking thyristor, the circuits being connected in such manner that such single switching condenser serves for both extinguishing circuits.

Figure 1:
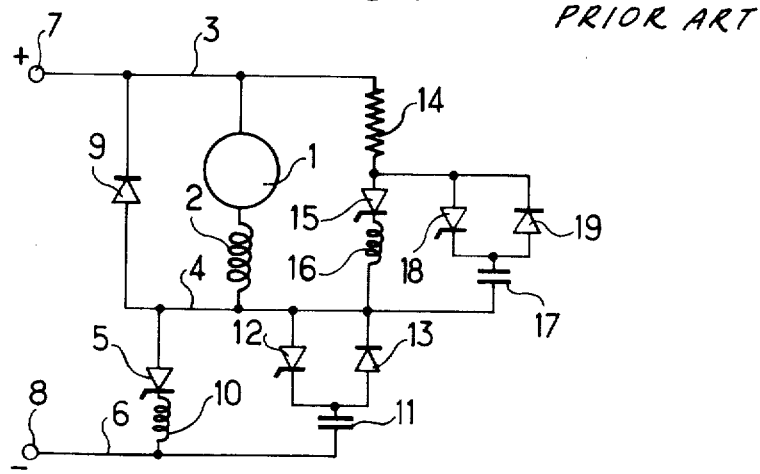
FIG. 1 shows a known circuit for a series excited motor, the circuit having two switching condensers.

The prior art circuit of FIG. 1 illustrates a series excited direct current motor which has its armature 1 and its field coil 2 connected in series across conductors 3 and 4. Conductor 4 is connected through a driving thyristor 5 to a main conduit 6 which is shown connected to the negative terminal 8. Conduit 3 is directly connected to the positive terminal 7 of a direct current source of supply (not shown) for the circuit. Between the conduits 3 and 4 of the motor there is connected a "free wheeling" diode 9 with its cathode connected to conduit 3. The driving thyristor 5 is provided with an extinguishing circuit made up of a choke coil 10, a switching condenser 11, and a circuit including an extinguishing thyristor 12 and a diode 13 which are connected in parallel but in opposite directions (herein termed an "anti-parallel" relationship), the anti-parallel circuit being connected in series with the switching condenser 11 which is interposed between the anti-parallel circuit and the conduit 6. As shown, the cathode of thyristor 12 is connected to the anode of diode 13.

In order to brake the motor 1, 2 between the conduits 3 and 4 of the motor there is connected a braking load in the form of a resistor 14 through the intermediary of a braking thyristor 15. The braking thyristor 15 is provided with an extinguishing circuit composed of a switching choke coil 16, a switching condenser 17, and an anti-parallel circuit having an extinguishing thyristor 18 and a diode 19 for recharging the condenser 17. In such anti-parallel circuit, the cathode of thyristor 18 is connected to the anode of diode 19.

Figure 2:
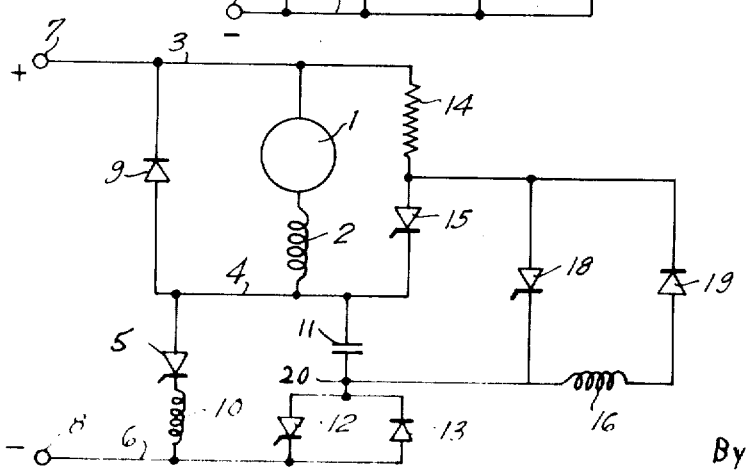
FIG. 2 is a diagram of a circuit in accordance with the invention, the circuit having only one switching condenser.

In FIG. 2, which shows a preferred embodiment of circuit in accordance with the invention, elements of the circuit which are the same as in FIG. 1 are designated by the same reference characters as in FIG. 1. It will be seen that the switching condenser 17 of the braking circuit of FIG. 1 has been omitted from the circuit of FIG. 2. In the circuit of FIG. 2, the function of the condenser 17 has been assumed by the condenser 11. For this purpose, a first terminal of the condenser 11 (FIG. 2) is connected to the conduit 4. The conduit 4 is shown as being directly connected to the cathode of the thyristor 15, the choke coil 16 of FIG. 1 having been omitted from between the cathode of thyristor 15 and the conduit 4. The second terminal of the condenser 11, designated by reference character 20, is common to the anode of the extinguishing thyristor 12 and the cathode of the condenser-charging diode 13. The extinguishing thyristor 18 is connected between the anode of the thyristor 15 and the junction 20, the cathode of thyristor 18 being connected to junction 20. The choke coil 16 may be connected in various places in the circuit; in FIG. 2 the choke coil 16 is shown connected between the cathode of the extinguishing thyristor 18 and the anode of the condenser-charging diode 19, the thyristor 18 and the diode 19 being connected in anti-parallel arrangement, as shown.

Figure 3:
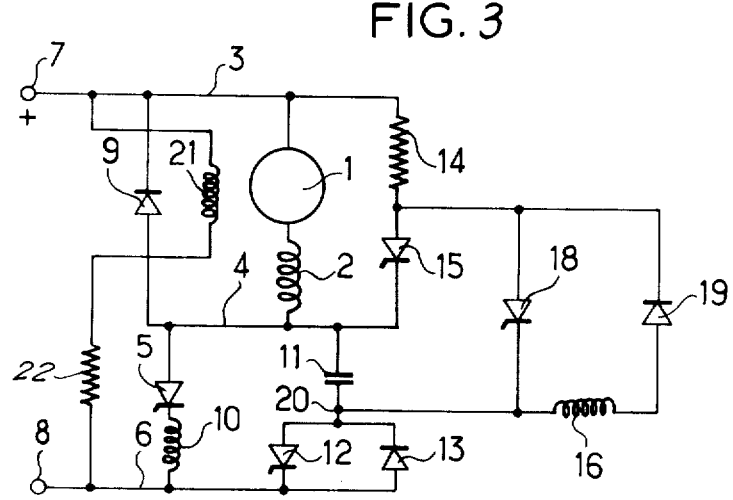
FIG. 3 is a diagram of a circuit which is a modification of the circuit of FIG. 2.

The above-described motor in the circuit of FIG. 2 has been assumed to be series excited. If it has a little residual magnetism, there may be added a small shunt field coil 21 to the series connected field coil 2, to form a compound motor as shown in FIG. 3. In the embodiment shown in FIG. 3, a resistor 22 is connected in series with the small field coil 21, the coil 21 and series resistor 22 being connected across the terminals 7, 8.

In the case of a separately excited motor, the circuit will be the same as in FIG. 2, except that the serially connected field coil 2 is not used, but is replaced by a field coil fed by the intermediary of an exciting thyristor provided with a thyristor extinguishing means.

Although the invention is illustrated and described with reference to a plurality of preferred embodiments thereof, it is to be expressly understood that it is in no way limited to the disclosure of such plurality of embodiments, but is capable of numerous modifications within the scope of the appended claims.

What is claimed is:

1. In an intermittent switching circuit for a DC motor:
   first switching means including a first normally unoperated thyristor in series with the motor armature;
   a load resistance;
   second switching means including a second normally unoperated thyristor serially interconnecting the armature and the load resistance;
   third and fourth normally unoperated thyristors;
   a common capacitor for coupling the third thyristor across the first switching means and for coupling the fourth thyristor across the second switching means;
   first and second rectifiers;
   first means for coupling the first rectifier across the third thyristor with their respective transconductive paths being oppositely directed; and
   second means for coupling the second rectifier across the fourth thyristor with their respective transconductive paths being oppositely directed.

2. A circuit as defined in claim 1, in which the second coupling means comprises an inductance.

3. A circuit as defined in claim 1, in which the first switching means further comprises an inductance in series with the first thyristor.

* * * * *